United States Patent
Woodall

(10) Patent No.: US 6,694,049 B1
(45) Date of Patent: Feb. 17, 2004

(54) MULTIMODE INVARIANT PROCESSOR

(75) Inventor: Roger L. Woodall, Jewett City, CT (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 629 days.

(21) Appl. No.: 09/641,395

(22) Filed: Aug. 17, 2000

(51) Int. Cl.$^7$ ............................................. G06K 9/62
(52) U.S. Cl. ..................... 382/159; 382/197; 382/224
(58) Field of Search ............................... 382/103, 159, 382/173, 197, 224, 225; 348/169; 700/47, 48; 706/20; 707/7

(56) References Cited

U.S. PATENT DOCUMENTS

| | | | | |
|---|---|---|---|---|
| 4,057,708 A | * | 11/1977 | Greeley et al. | 235/413 |
| 4,396,903 A | * | 8/1983 | Habicht et al. | 382/103 |
| 5,245,672 A | * | 9/1993 | Wilson et al. | 382/179 |
| 5,311,600 A | * | 5/1994 | Aghajan et al. | 382/156 |
| 5,974,163 A | * | 10/1999 | Kamei | 382/125 |

OTHER PUBLICATIONS

Mills "The Continuous Retina: image processing with a single–sensor artificial neural network", IEEE, pp. 886–891, 1996.*

Imade, et al. "Segmentation and classification for mixed text/image documents using neural network", IEEE, pp. 930–934, 1993.*

Crouzil, et al. "A new correlation criterion based on gradient fields similarity", IEEE, pp. 632–636.*

Po, et al. "Directionally classified subspace image vector quantization", IEEE, pp. 336–339, 1991.*

* cited by examiner

Primary Examiner—Daniel Mariam
(74) Attorney, Agent, or Firm—James M. Kasischke; Michael F. Oglo; Jean-Paul A. Nasser

(57) ABSTRACT

A multimode invariant processor is provided to simultaneously classify one or more patterns in multidimensional or in two dimensional "real world" images. The classification is invariant to a translation, a change in scale size and a rotation of a whole or partially hidden photonic image. The multimode invariant image processor comprises a retina portion, a nonlinear processing portion, a convergence processing portion and a classifier portion. The retina portion processes the photonic image to obtain an image data array of pixels and further process the array of pixels through a window difference network to obtain gradients of the image data. The neural directors of the nonlinear processing portion receive the gradients and generate respective feature vectors, which may have a greater dimensionality than the gradient information, to aid in discrimination between similar patterns in the image data. The convergence portion processes the feature information to generate a convergence of common feature information representing at least one image feature in the image data. The classifier portion receives the common feature information and generates in response feature classification information indicating the likelihood that selected features are present in the image.

12 Claims, 6 Drawing Sheets

MULTIMODE INVARIANT PROCESSOR

CROSS-REFERENCE TO RELATED APPLICATIONS

This patent application is with related patent applications entitled NEURAL DIRECTORS (U.S. patent application Ser. No. 09/436,957, which is now U.S. Pat. No. 6,618,713 issued Sep. 9, 2003), NEURAL SENSORS (U.S. patent application Ser. No. 09/436,956, which is now U.S. Pat. No. 6,594,382 issued Jul. 15, 2003), STATIC MEMORY PROCESSOR (U.S. patent application Ser. No. 09/477,638 which is now abandoned) and DYNAMIC MEMORY PROCESSOR (U.S. patent application Ser. No. 09/477,653, which is now U.S. Pat. No. 6,560,582 issued May 6, 2003), by the same inventor as this patent application.

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION (1) Field of the Invention

The present invention relates generally to the field of electronic neural networks, and more particularly to a new architecture for neural networks having a plurality of hidden layers, or multi-layer neural networks, and further to a new neural network processor for classifying patterns in optical image data, or other arrays of input data having one or more input dimensions.

(2) Description of the Prior Art

Electronic neural networks have been developed to rapidly identify patterns in certain types of input data, or to accurately classify the input patterns into one of a plurality of predetermined classifications. For example, neural networks have been developed which can recognize and identify patterns, such as the identification of hand-written alphanumeric characters, in response to input data constituting the pattern of on/off picture elements, or "pixels," representing the images of the characters to be identified. In such a neural network, the pixel pattern is represented by, for example, electrical signals coupled to a plurality of input terminals, which, in turn, are connected to a number of processing nodes, or neurons, each of which is associated with one of the alphanumeric characters which the neural network can identify. The input signals from the input terminals are coupled to the processing nodes through certain weighting functions, and each processing node generates an output signal which represents a value that is a non-linear function of the pattern of weighted input signals applied thereto. Based on the values of the weighted pattern of input signals from the input terminals, if the input signals represent a character, which can be identified by the neural network, one of the processing nodes that is associated with that character will generate a positive output signal, and the others will not. On the other hand, if the input signals do not represent a character, which can be identified by the neural network, none of the processing nodes will generate a positive output signal. Neural networks have been developed which can perform similar pattern recognition in a number of diverse areas.

The particular patterns that the neural network can identify depend on the weighting functions and the particular connections of the input terminals to the processing nodes, or elements. As an example, the weighting functions in the above-described character recognition neural network essentially will represent the pixel patterns that define each particular character. Typically, each processing node will perform a summation operation in connection with the weight values, also referred to as connection values or weighting values, representing the weighted input signals provided thereto, to generate a sum that represents the likelihood that the character to be identified is the character associated with that processing node. The processing node then applies the non-linear function to that sum to generate a positive output signal if the sum is, for example, above a predetermined threshold value. The non-linear functions, which the processing nodes may use in connection with the sum of weighted input signals, are generally conventional functions, such as step functions, threshold functions, or sigmoids. In all cases the output signal from the processing node will approach the same positive output signal asymptotically.

Before a neural network can be useful, the weighting functions for a set of the respective input signals must be established. In special cases, the weighting functions can be established a priori. Normally, however, a neural network goes through a training phase, in which input signals representing a number of training patterns for the types of items to be classified (e.g., the pixel patterns of the various hand-written characters in the character-recognition example) are applied to the input terminals, and the output signals from the processing nodes are tested. Based on the pattern of output signals from the processing nodes for each training example, the weighting functions are adjusted over a number of trials. Once trained, a neural network can generally accurately recognize patterns during an operational phase. The degree of success is based in part on the number of training patterns applied to the neural network during the training stage and the degree of dissimilarity between patterns to be identified. Such a neural network can also typically identify patterns that are similar to the training patterns.

One of the problems with conventional neural network architectures as described above is that the training methodology, generally known as the "back-propagation" method, is often extremely slow in a number of important applications. Also, under the back-propagation method, the neural network may provide erroneous results, which may require restarting the training. In addition, even after a neural network has been through a training phase, confidence that the best training has been accomplished may sometimes be poor. If a new classification is to be added to a trained neural network, the complete neural network must be retrained. Further, the weighting functions generated during the training phase often cannot be interpreted in ways that readily provide understanding of what they particularly represent.

In my related patent application entitled "NEURAL DIRECTORS" (Ser. No. 09/436,957, which is now U.S. Pat. No. 6,618,713), incorporated herein in its entirety by reference, a new neural network architecture, or neural director, was described in which the weighting functions may be determined a priori, i.e., the new neural network architecture is constructed rather then trained. The neural director has an input processing node layer, which receives the input vector X and an output processing node layer, which generates the output vector Y. In a type 1 neural director containing linear neurons, the connections between the input and output processing node layers are a unique weighting set w(i,j) that contains an internal representation of a uniform spatial distribution of "J" unit vectors throughout a unit sphere of "I" dimensions. Thus the cosine value between any two adjacent unit vectors is a constant everywhere in the unit sphere. A type 1 neural director is thus described as linear in both its neural circuit, i.e., classically linear, and in its space, i.e., spatially linear. A type 2 neural director, is generally classically linear but spatially nonlinear, though it will be understood that either classic or spatial nonlinearity will result in a neural director type 2. A spatial nonlinearity causes an input vector pair to diverge in direction in the output space and is analogous to a system nonlinearity in chaos theory where two similar initial condition points diverge over time. In the case of spatial nonlinearity, the system divergence occurs as the input data flows through repetitious stages of nonlinearity versus a chaotic system recursion over time. One of the many important characteristics of a constructed neural network is that a classification of an input pattern is greatly defined by a vector's direction in a multidimensional space. Reduced to its most basic concept, a constructed neural network senses features from a specific input pattern to provide a deterministic direction through a connecting circuit as a feature vector. This deterministic direction in a multidimensional space is the information that is used for the recognition and classification of the pattern. When compared to a neural director type 1 of the same input and output dimensions, a neural director type 2 nonlinearly shifts an input vector away from the output direction which one would anticipate using the neural director type 1. A neural director type 2 produces a nonlinear gradient between two poles it its multidimensional output space, one pole lying in the center of a sub space that is directed by all positive elements and the other pole being the opposite polarity. The spatial nonlinearities of the type 2 neural director provide a process that allows the discrimination of finer details in the recognition of an input pattern. Depending on the resolution chosen for the internal representation of the uniform spatial distribution, a neural director type 1 may be called a "near" ideal neural director type 1. A near ideal neural director type 1 remains linear in its neural circuit but it is slightly nonlinear in space because the position of a vector in the neural director's output space will be altered relative to the vector's ideal position in a linear space. Used in a multilayer neural director, the near ideal neural director type 1, without other nonlinearities, increases the recognition resolution of similar patterns.

My related patent application "NEURAL SENSORS" (Ser. No. 09/436,956, which is now U.S. Pat. No. 6,594,382), incorporated herein in its entirety by reference, described the use of neural directors, in combination with other constructed neural network components, to provide a neural sensor. The neural sensor receives raw input data defining a pattern, such as image or sound data, and generates a classification identifier for the pattern. The neural sensor has a pattern array former that organizes the raw input data into the proper array format. A first order processing section receives the pattern array and generates a first order feature vector illustrative of first order features of the input data. A second order processing section also receives the pattern array and generates at least one second order feature vector illustrative of gradients in the input data. A vector fusion section receives the feature vectors from the first and second order processing sections and generates a single fused feature vector, which is provided to a pattern classifier network, or memory processor.

The memory processor, embodiments of which are described in my related patent applications "DYNAMIC MEMORY PROCESSOR" (Ser. No. 09/477,653, which is now U.S. Pat. No. 6,560,582) and "STATIC MEMORY PROCESSOR" (Ser. No. 09/477,638 which is now abandoned), incorporated herein in their entirety by reference, receives the fused feature vector and, in turn, generates a pattern classification for the input data. Generally, the neural sensor increases input data dimensionality for improved pattern sensitivity, while the memory processor reduces the data dimensionality into a specific class. The dynamic memory processor provides for recognition of a time variant input pattern and is particularly suited for speech recognition. The static memory processor provides for recognition of a non-time varying input image, or pattern and provides a class identifier for the dominant image.

SUMMARY OF THE INVENTION

Accordingly, it is an object of the present invention to provide a new and improved neural network architecture for use in pattern recognition in which the input image contains one or more whole or partially hidden patterns.

Other objects and advantages of the present invention will become more obvious hereinafter in the specification and drawings.

In accordance with the present invention, a new neural network architecture, referred to hereinafter as a Multimode Invariant Processor (MIP), is provided. The MIP utilizes one or more constructed neural network modules, such as neural directors, Positional King Of the Mountain (PKOM) circuits, a static memory processor and others to provide unique invariant processes producing classifications of the input data. The multimode invariant processor contains an architecture to process one, two, or higher dimensional arrays of input data. One embodiment of the MIP architecture, a two dimension architecture, produces a process similar to human peripheral vision. This embodiment will be described herein to provide a full understanding of the invention and an understanding for developing MIP architectures of other dimensionalities.

In brief summary, an image MIP, i.e., a two dimensional MIP, is provided to simultaneously classify one or more whole or partially hidden patterns in real world optical image data. The classification processing is invariant to combinatorial changes in photonic input image translation, scale size, rotation and partial image input data. The photonic input image or input image defines two-dimensional spatial data from an array of photo transducers or pixels each represented by a pixel value. The multimode invariant processor comprises a retina portion, a spatial nonlinear portion, a convergence processing portion and a classifier portion. The retina portion receives the input image and transforms the input image into image data and generates in response a vector of local image gradient information for each pixel. The spatial nonlinear portion includes a neural director array (harmonic neural network) associated with each respective pixel, which generates respective feature vectors. The feature vectors can have a greater dimensionality than the image data, to aid in discrimination between similar patterns of the input image. The spatial nonlinear portion processes image data to further increase the discrimination between similar patterns of the input image and to generate image feature information representing at least one image primitive of the input image. An image primitive is defined as a smallest part of an image that can be distinguished from another image primitive of said image, with respect to a specific MIP input resolution. The convergence processing portion further increases the discrimination between similar patterns of the input image and generates and converges local common image feature information from any pixel position through a common feature space into a portion of a memory vector space. Each independent input image generates a set of primitive activations in the memory vector space. The classifier portion receives all primitive activations, or information, and generates in response a classification indicating the likelihood that one or more independent images are present in an image input data.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein corresponding reference characters indicate corresponding parts throughout the several views of the drawings and wherein.

DESCRIPTION OF THE PREFERRED EMBODIMENT

Figure 1:
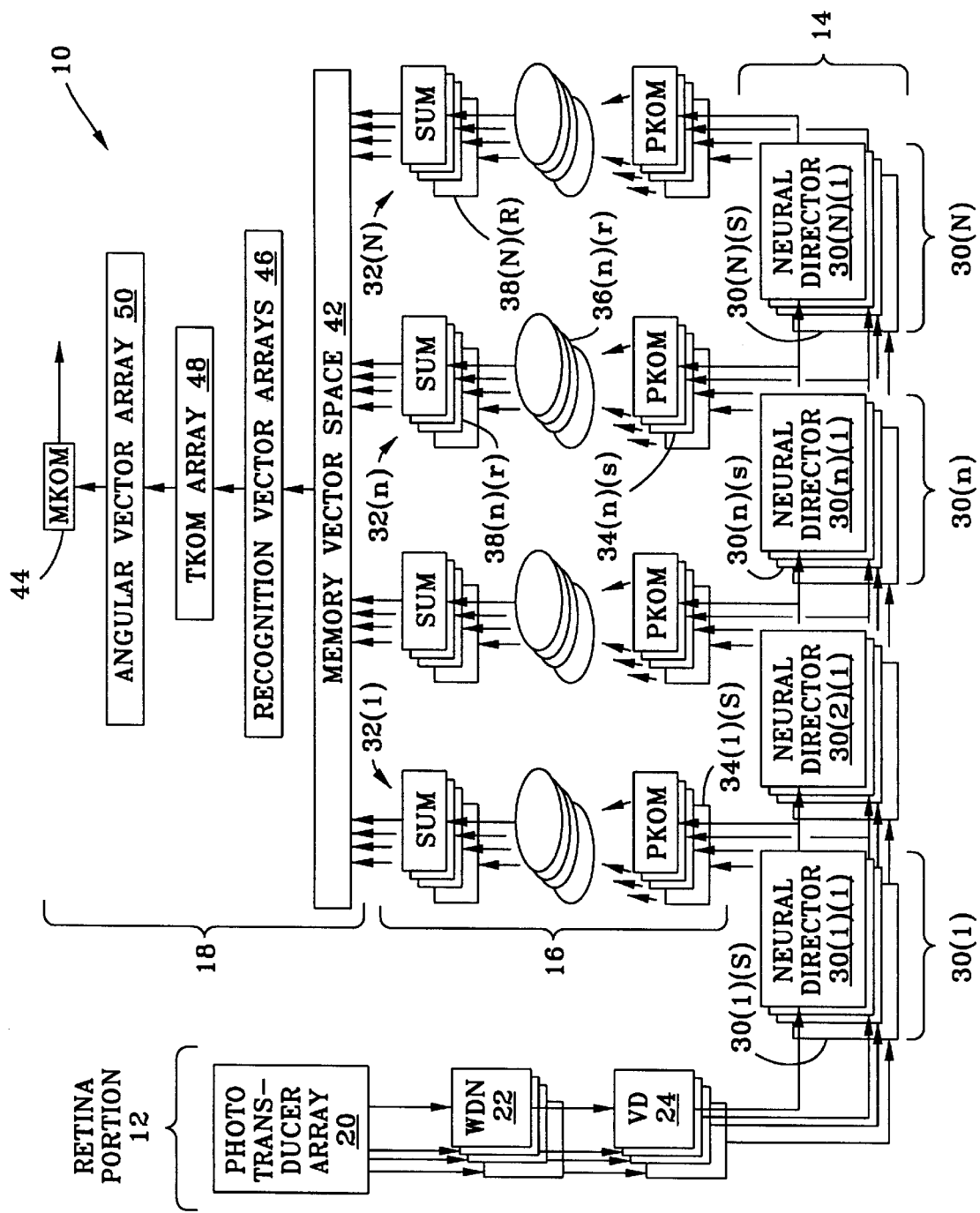
FIG. 1 is a functional block diagram of an illustrative multimode invariant processor.

FIG. 1 is a functional block diagram of a two-dimensional multimode invariant processor 10 constructed in accordance with the present invention. One of the most important processes of a multimode invariant processor is as a feed forward neural network device where the data of one or more input images, each of a specific form, can traverse through multiple possible distributed paths in a connectionist architecture to a single specific output for each classification representing each said specific image forms. This process uses primitives within the input images to direct and converge feature information into multiple common feature areas of which classifications are determined. The multimode invariant processor 10 receives input data, which defines an image, and generates an output vector that identifies, for the data defining the particular image that it receives, at least one classification for the input pattern. The multimode invariant processor 10 includes a retina portion 12, a non-linear processing portion 14, a convergence processing portion 16 and a classifier portion 18. As is conventional, the retina portion 12 transforms optical or photonic image data into data in the form of an array of picture elements ("pixels") with data for each pixel (a "pixel value") comprising a scalar value defining the intensity of the pixel in the image. The potentials, or values, for the various pixels in the image are generated in any conventional manner. As an example, the retinal portion 12 of FIG. 1 uses an array of transducers 20 for optical intensity conversion to continuous analog levels of image data transformation, or its digital equivalence, depending in the physical configuration of the device.

In addition, the retina portion generates a set of feature vectors that serve to identify primitives of the image. In particular, feature vectors generated by the retina portion 12 identify, for the various pixels in the image, differences or gradients in the pixel data between the respective pixel and pixels in a region, or window, around the respective pixel. The nonlinear processing portion 14 processes the feature vectors generated by the retina portion 12 and generates a number of aggregate feature vectors representing image primitives that are used in classifying the various features in the image.

Figure 2:
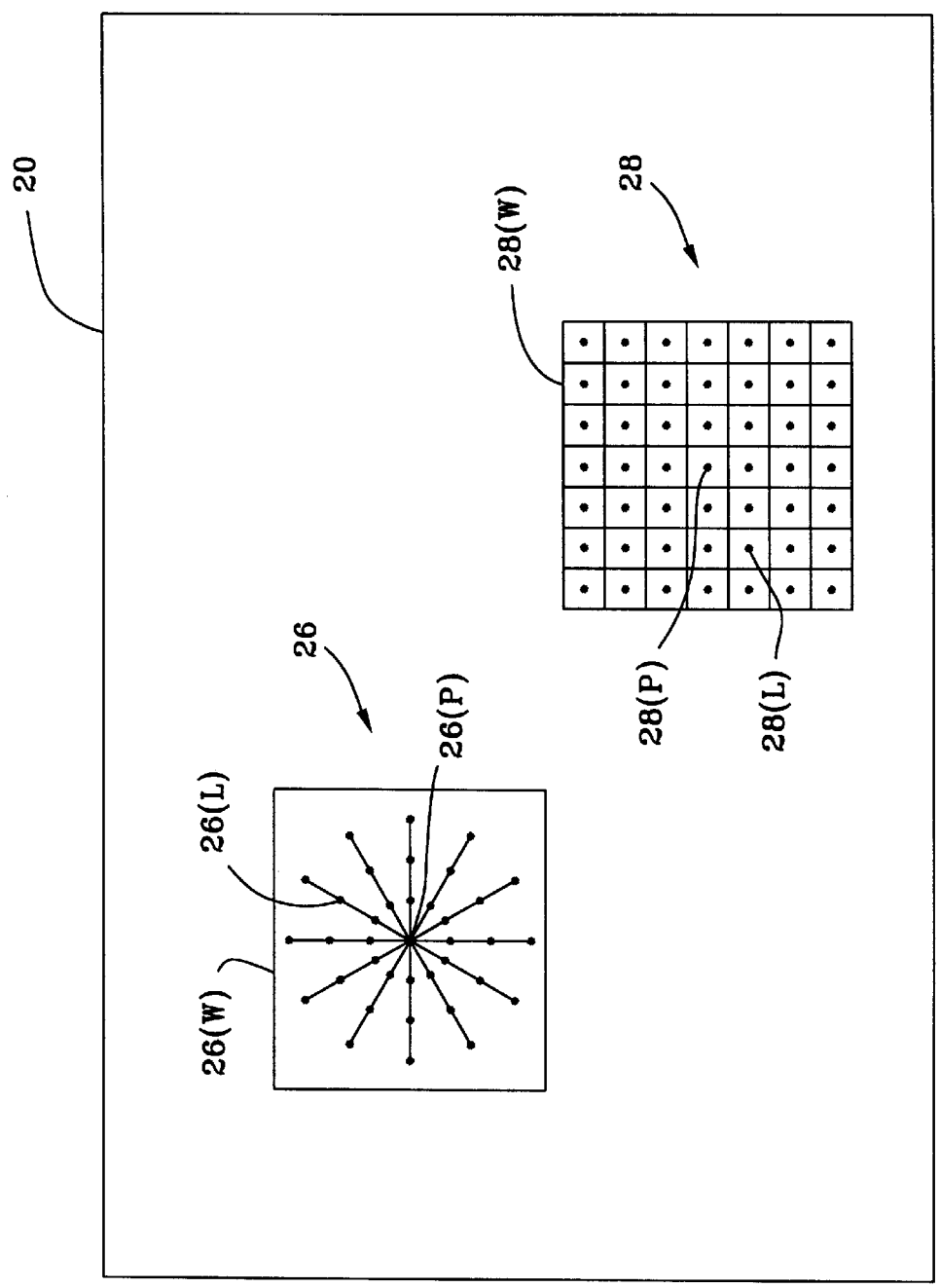
FIG. 2 is a schematic representation of a pixel gradient window for use in the retina portion.

More specifically, and with reference also to FIG. 2, the retina portion 12 further includes a window difference network (WDN) 22 and a vector decoupler (VD) 24. The window difference network 22 generates, for each pixel, an array defining gradients with respect to the pixel according to a predetermined pattern in a window surrounding the pixel, as will be described below in connection with FIG. 2. The vector decoupler 24, in turn, receives the gradient vectors generated by the window difference network 22. If there is a fixed offset in the gradient vectors generated by the window difference network 22, the vector decoupler 24 will adjust the values of the vectors to remove the fixed offset. It will be appreciated that the retina portion 12 may include one or a few window difference networks 22 and vector decouplers 24, which operate in parallel, each generating decoupled gradient vectors for a plurality of pixels. Alternatively, the retina portion 12 may include a number of window difference networks 22 and vector decouplers 24 corresponding to the number of pixels in the image, with each window difference network 22 and vector decoupler 24 generating a decoupled gradient vector for one of the pixels in the image.

As described above, the window difference network 22 generates, for each pixel, an array defining gradients with respect to the pixel according to a predetermined pattern in a window surrounding the pixel. FIG. 2 depicts two illustrative patterns, identified by reference numerals 26 and 28, respectively, which the window difference network 22 may use in generating the gradient vectors. For pattern 26, identified as a "star" pattern, the window difference network 22 defines a window 26(W) around the pixel 26(P) for which the gradient vector is being generated. To generate the gradient vector, the window difference network 22 selects pixels along a number of lines, generally identified by reference numeral 26(L), which are equiangularly disposed about the pixel 26(P), and generates for each such pixel a value corresponding to the difference between the pixel value for the pixel and the pixel value for pixel 26(P). The gradient vector for the star pattern 26 corresponds to the set of difference values so generated. For pattern 28, identified as a "block" pattern, the window difference network 22 defines a similar window 28(W) around the pixel 28(P) for which the gradient vector is being generated. To generate the gradient vector, the window difference network 22 generates for each pixel in the window 28(W) a value corresponding to the difference between the pixel value for the pixel and the pixel value for pixel 28(P). It will be appreciated that the window difference network 22 may also use other patterns in generating the gradient vectors.

Nonlinear processing portion 14 of FIG. 1 includes a plurality of neural director layers 30(1) through 30(N), generally identified by reference numeral 30(n). Each neural director layer 30(n) in turn comprises a plurality of neural directors 30(n)(1) through 30(n)(S), where "S" corresponds to the number of pixels in the image. Thus, the neural directors are generally identified by reference numeral 30(n)(s) and each neural director 30(n)(s) in a neural director layer 30(n) is associated with a specific pixel "s" in the image. It is noted that in the embodiment of FIG. 1, each neural director 30(n)(s) is a near ideal neural director type 1 that contains an overall uniform spatial linearity and slight local spatial nonlinearities representing a simple harmonic neural network. For neural layer 30(1), each neural director 30(1)(s) receives the gradient vector for the associated pixel "s" from retina portion 12. In response, the neural director 30(1)(s) generates a feature vector for the pixel which may have a greater dimensionality than the gradient vector, to aid in discrimination between similar patterns in the image data. The direction of a feature vector can be seen to correspond with a specific feature, or primitive, at least one of which may be present in the image.

As noted above, the nonlinear processing portion 14 includes a number "N" of neural director layers 30(n). Each neural director 30(n)(s) in a layer 30(n) receives the feature vector from the correspondingly indexed neural director 30(n−1)(s) of the preceding layer 30(n−1) and generates in response a feature vector which may have a greater dimensionality than the received feature vector, to further aid in discrimination between similar patterns in the image data. The neural directors 30(n)(s) for the same value of index "s" generate feature vectors for a particular pixel in the image.

Figure 3:
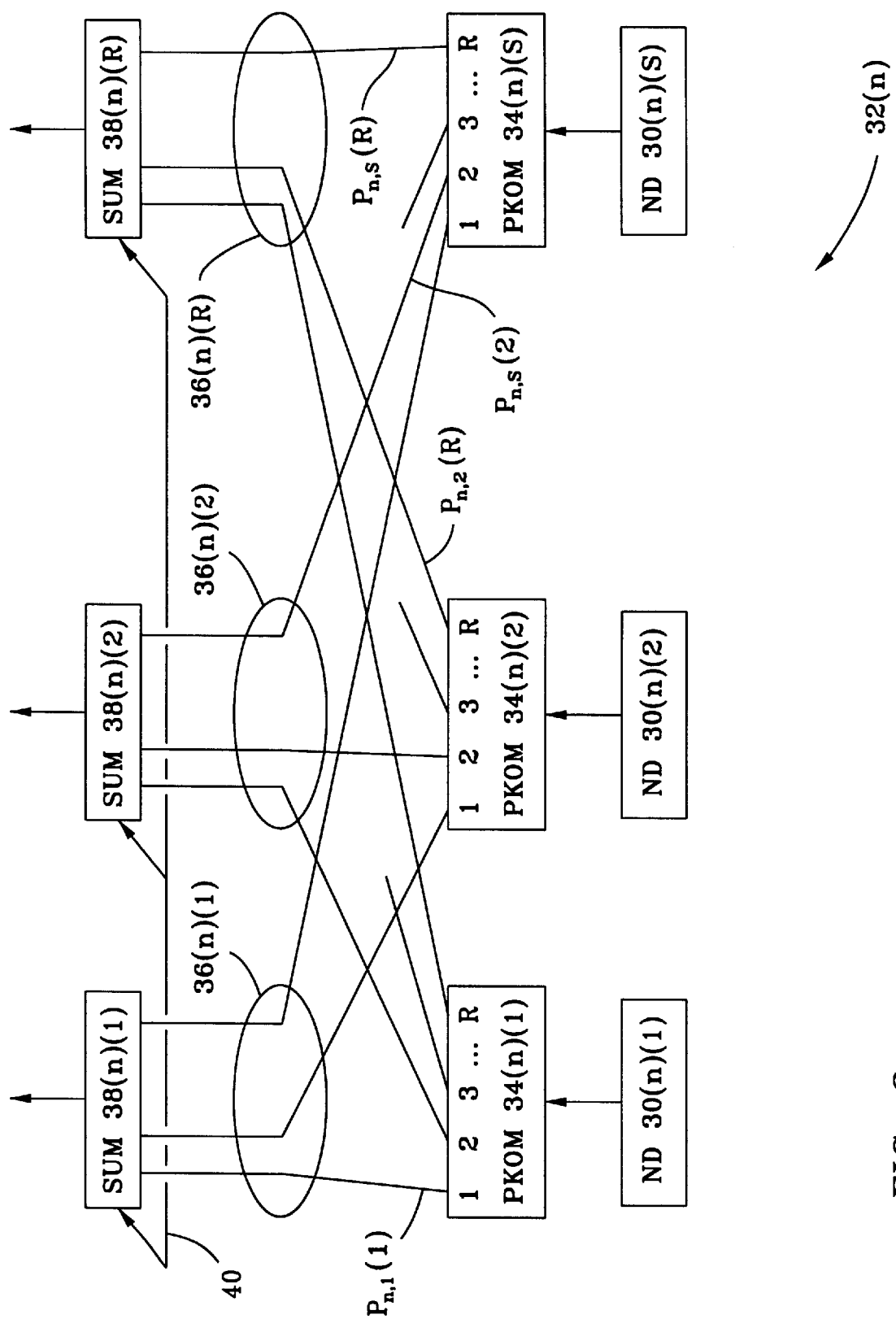
FIG. 3 is a schematic representation of a convergence processing portion of the multimode invariant processor.

The output feature vectors from the neural directors 30(n)(s) of all of the neural director layers 30(n) are coupled through the convergence processing portion 16. The convergence processing portion 16 is generally shown in FIG. 1. The convergence processing portion 16 comprises a plurality of processing layers 32(1) through 32(N), generally identified by reference numeral 32(n). FIG. 3 is a depiction of one such processing layer 32(n). With reference to FIGS. 1 and 3, each processing layer 32(n) is associated with one of the neural director layers 30(n). Each processing layer 32(n), in turn, comprises a plurality "S" of "positional king-of-the-mountain" circuits 34(n), generally identified by reference numeral 34(n)(s), a plurality "R" of common feature spaces 36(n), generally identified by reference numeral 36(n)(r), where "R" is the number of dimensions in the feature vector, and a plurality "R" of summing circuits 38(n), generally identified by reference numeral 38 (n) (r)

Each positional king-of-the-mountain circuit 34(n)(s) of a processing layer 32(n) receives the feature vector from the correspondingly-indexed neural director 30(n)(s) of the corresponding neural director layer 30(n). Each positional king-of-the-mountain circuit 34(n)(s) generates a number of outputs $P_{n,s}(1)$ through $P_{n,s}(R)$, generally identified by reference numeral $P_{n,s}(r)$, each of which may have a negated value, representing a zero activation, or an asserted value corresponding to a value of one. Each output $P_{n,s}(1)$ through $P_{n,s}(R)$ is associated with one of the "R" dimensions, r, or features (primitives) of the image as represented in the feature vector generated by the neural director 30(n)(s). The positional king-of-the-mountain circuit 34(n)(s) asserts, or effectively generates a "one" for the output associated with the dimension, or primitive, for which the feature vector component has the highest value, and negates, or effectively generates a "zero" for each of its other outputs associated with other features.

For each layer 32(n), the outputs from the layer's positional king-of-the-mountain circuits 34(n) are coupled through the common feature spaces 36(n) to the summing circuits 38(n) of the layer 30(n). Thus, each common feature space 36(n)(r) receives "S" outputs, one output from each of the positional king-of-the-mountain circuits 34(n) relating to a particular feature in the image. Each common feature space 36(n)(r), in turn, supplies the "S" outputs to the correspondingly-indexed summing circuit 38(n)(r). It can be seen that the common feature spaces 36(n) are virtual spaces, which aid in the understanding of the invention. A single common feature space 36(n)(r) represents an activity space produced by one, and only one, specific primitive activated by at least one pixel in retina 12. The process through the common feature spaces 36(n)(r) is from an architecture that produces identical sum neuron array activations for a specific image regardless of its vertical and/or horizontal positions within retina 12 and is similar to a basic form of human peripheral vision. In addition, the summing circuits 38(n) also receive a global threshold 40 against the sum values. The global threshold 40 may be fixed or may be a proportion of the global input value in all processing layers 32. The global threshold 40 inhibits each summing circuit output by the threshold value and all summing circuit outputs below the threshold value are inhibited to zero. Each summing circuit 38(n)(r), in turn, generates an output value that corresponds to a proportional sum of the values provided thereto by the common vector spaces 36(n)(r). The value effectively corresponds to the number of positional king-of-the-mountain circuits 34(n)(s) that generate a "one" for the "r-th" feature. Thus, the value generated by each summing circuit 38(n)(r) indicates the degree to which a particular feature, or primitive, is present in the image.

Figure 4:
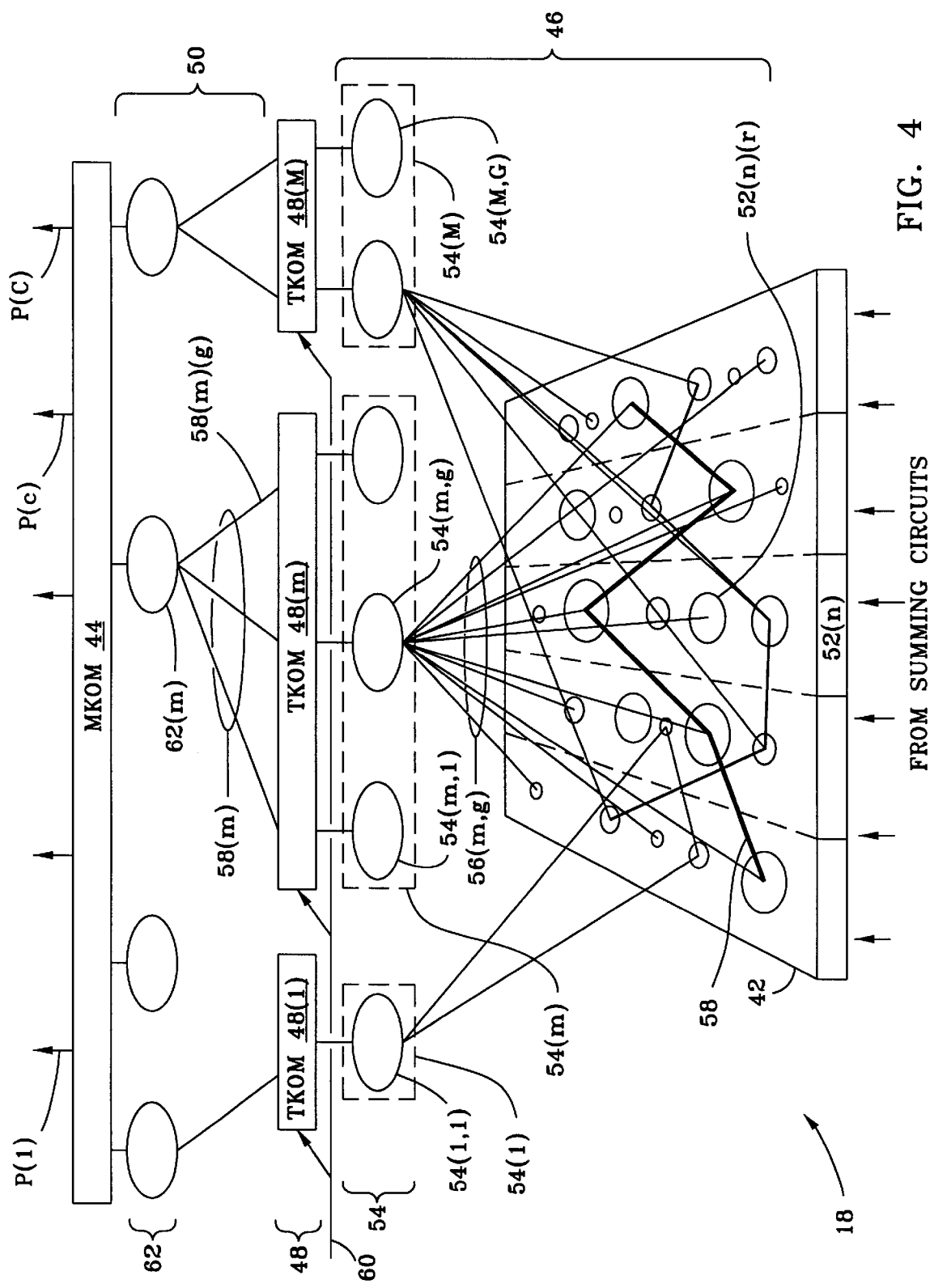
FIG. 4 is a schematic representation of the classifier portion of the multimode invariant processor.

The outputs of the summing circuits 38(n)(r) in all of the processing layers 32(n) are provided to the classifier portion 18. The classifier portion 18 is generally depicted in FIG. 1, and is also schematically shown in detail in FIG. 4. With reference to those FIGS., the summing circuit outputs are received into classifier portion 18 at memory vector space 42 and processed through classifier portion 18 to provide a classification output at multi-king-of-the-mountain (MKOM) circuit 44. Classifier portion 18 further includes a set of recognition vector arrays 46, which interconnects memory vector space 42 and threshold king-of-the-mountain (TKOM) array 48. Angular vector array 50 interconnects TKOM array 48 and MKOM circuit 44. The memory vector space 42 effectively comprises a virtual set of multi-dimensional spaces, which contain the "primitive" activations from the respective summing circuits 38(n)(r) from all of the processing layers 32(n) to the set of recognition vector arrays 46. The set of recognition vector arrays 46 is essentially a neural network that receives the inputs from the memory vector space 42 and generates one or more outputs reflective of various primitives in the image. The memory vector space 42 contains a representation of the composite "primitives" of one or more objects in the image. In FIG. 4, a primitive activation output from a summing circuit 38(n)(r) at a memory location in the multidimensional memory space 42 is shown as an ellipse, one of which is indicated as 52(n)(r). The relative size of ellipse 52(n)(r) represents the level of activation at the memory location.

The set of recognition vector arrays 46 contains neurons 54, arranged into "M" groups, indicated as 54(1) through 54(M), of "G" neurons generally referred to as 54(m)(g). "M" signifies the number of potential classes of patterns in an input image, while "G" signifies the number of various aspects of a class, e.g., various views of the same object. Each of the aspects of a specific input pattern class 54(m) represents the various primitives of an input pattern or object image in at least one rotational position. Different classes may have differing numbers of aspects. As an example, a sphere would have a single aspect, i.e., it would appear the same in all views and "G" would be one. An input image is represented by a recognition vector through its associative matched connections between each active memory location 52 and a neuron 54(m)(g). Neuron 54(m)(g) with its connection set 56(m)(g) become a recognition vector of a classification group 54(m), corresponding to and matching the active memory pattern. The active memory pattern, i.e., the pattern of activation outputs 52(n)(r), is shown in FIG. 4 as a single line memory vector 58 for simplicity. In actuality, memory vector 58 is a memory vector of vectors composed of active memory locations 52(n)(r) for each active memory array 52(n).

The outputs from the set of recognition vector arrays 46 are provided to TKOM array 48, i.e., outputs from a recognition vector array group 54(m) are provided to TKOM circuit 48(m) of TKOM array 48. A TKOM circuit operates in a manner similar to a PKOM circuit, as described previously. Whereas a PKOM outputs a unit value for the highest input element value, the TKOM outputs a value corresponding to the highest input element value and all other output dimensions are zero. TKOM array 48 includes threshold 60, which operates in a manner similar to threshold 40, also described previously. Threshold 60 inhibits each output by the threshold value and all outputs not a positive value are zero. Thus, the output value of the TKOM is seen to correspond to the highest input element value, in that the actual output value is the highest input element value inhibited by the threshold value. A TKOM circuit 48(m) senses all recognition vector array group 54(m) outputs, of a class, representing various pattern rotations in the input image as noted previously, and generates an output representing the likelihood that the image contains a class object at an angle of rotation. The TKOM array 48 generates at least one classification for a recognized pattern in the input image that exceeds threshold 60. The output of TKOM array 48 provides an input to angular vector array 50. Angular vector array 50 is comprised of neurons 62 and arrays 58(m) of unitary connections, with each unitary connection 58(m)(g) of the array of unitary connections 58(m) being between its corresponding TKOM circuit 48(m) and neuron 62(m). Each array of unitary connections 58(m) and corresponding neuron 62(m) represents one potential class of a pattern in an input image rotated at/from a normal position.

The outputs of the angular vector array 50 are coupled to MKOM circuit 44. MKOM 44 generates a number of class outputs P(1) through P(C), generally identified by reference numeral P(c), each of which is associated with an output class. Each output can have a range of values from a negated value representing "zero", up to a maximum asserted value relative to a maximum MKOM 44 input element magnitude. Each class, in turn, corresponds to at least one primitive, which may be present in the image. The angular vector array 50, in receiving the outputs of the set of recognition vector arrays 46 through the TKOM circuits 48, generates outputs that represent the likelihood that the image contains at least one primitive, with the outputs associated by each class in the image. MKOM 44, in turn, generates a number of outputs, each associated with an image class, with the class whose likelihood is the highest having the maximum asserted value, and the classes having other likelihoods having values, with respect to the maximum asserted value, in proportion to their respective likelihoods.

All architectural components, or connections of the multimode invariant image processor 10 are constructed a priori except for each connection set 56(m)(g) and unit connections 58(m)(g). Learning of a class, or training of the multimode invariant image processor 10, is accomplished with a single application of an oriented input pattern of a known class, so as classify its associative recognition vector in the set of recognition vector arrays 46, through the TKOM array 48 to the associative angular vector in angular vector array 50. The input pattern is applied to the retina transducer array 20, which produces activations 52(n)(r) in memory vector space 42, as previously described. An associative matched connection array 56(m)(g) is applied between each activation 52(n)(r) and an untrained neuron 54(m)(g) to generate a recognition vector assigned the classification. The connections 56(m)(g) are normalized to produce a unitary output of the neuron 54(m)(g) when activated. The associative connections 56(m)(g) together with the neuron 54(m)(g) are now known as a recognition vector of the set of recognition vector array 46. The active recognition vector neuron 54(m)(g) feeds its activity through TKOM 48(m), having only one active output. Thus, a single unit connection 58(m)(g) is applied between TKOM 48(m) output and an unassigned angular vector neuron 62(m). The associative connection 58(m)(g), together with the angular vector neuron 62(m), are known as an angular vector of the angular vector array 50. If a different angular placement is required for the same class then the next recognition and angular vector of said class is trained and so forth. The above process is repeated as required for the initial training of each class or for the retraining or addition of a new classification for the multimode invariant image processor 10.

The multimode invariant image processor 10 described above in connection with FIGS. 1 through 4 provides a number of advantages. In particular, it provides a new arrangement that efficiently detects features in images through the memory vector space without the need of training as is required in connection with, for example, conventional neural network arrangements. For the minor portion of the processor 10 that requires training, the training is quickly performed by a single application of an input pattern of a specific configuration. The processor 10 can detect multiple, independent, whole, or partial patterns regardless of their registration on the image plane, regardless of their angular position on the image plane, and regardless of their scale of image size. Common features or primitives of a pattern are always grouped in a specific virtual common feature space regardless of the pattern variances and are presented to the memory vector space for an invariant recognition. It now becomes obvious that for a higher dimension embodiment, each higher dimension shall contain one more dimension of the two dimension retina portion and its related pixel gradient network, the spatial nonlinear portion, the convergence processing portion and the memory vector space. Each recognition vector neuron 54(m)(g) shall connect to the multidimensional memory vector space as described above, and the angular vector neuron 62(m) shall represent a multidimensional aspect for the object of classification.

Figure 5:
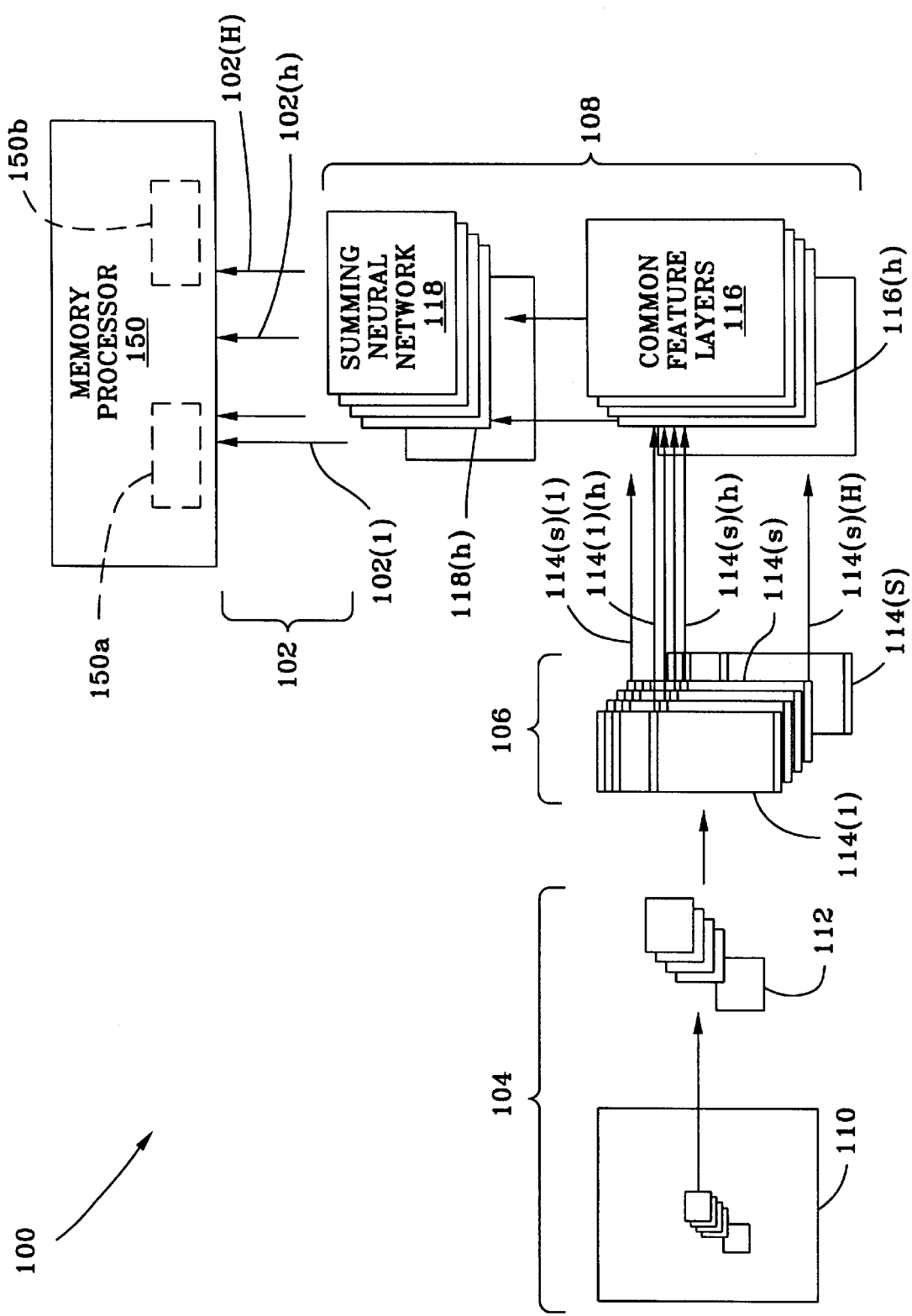
FIG. 5 is a functional block diagram of a second embodiment of the multimode invariant processor.
Figure 6:
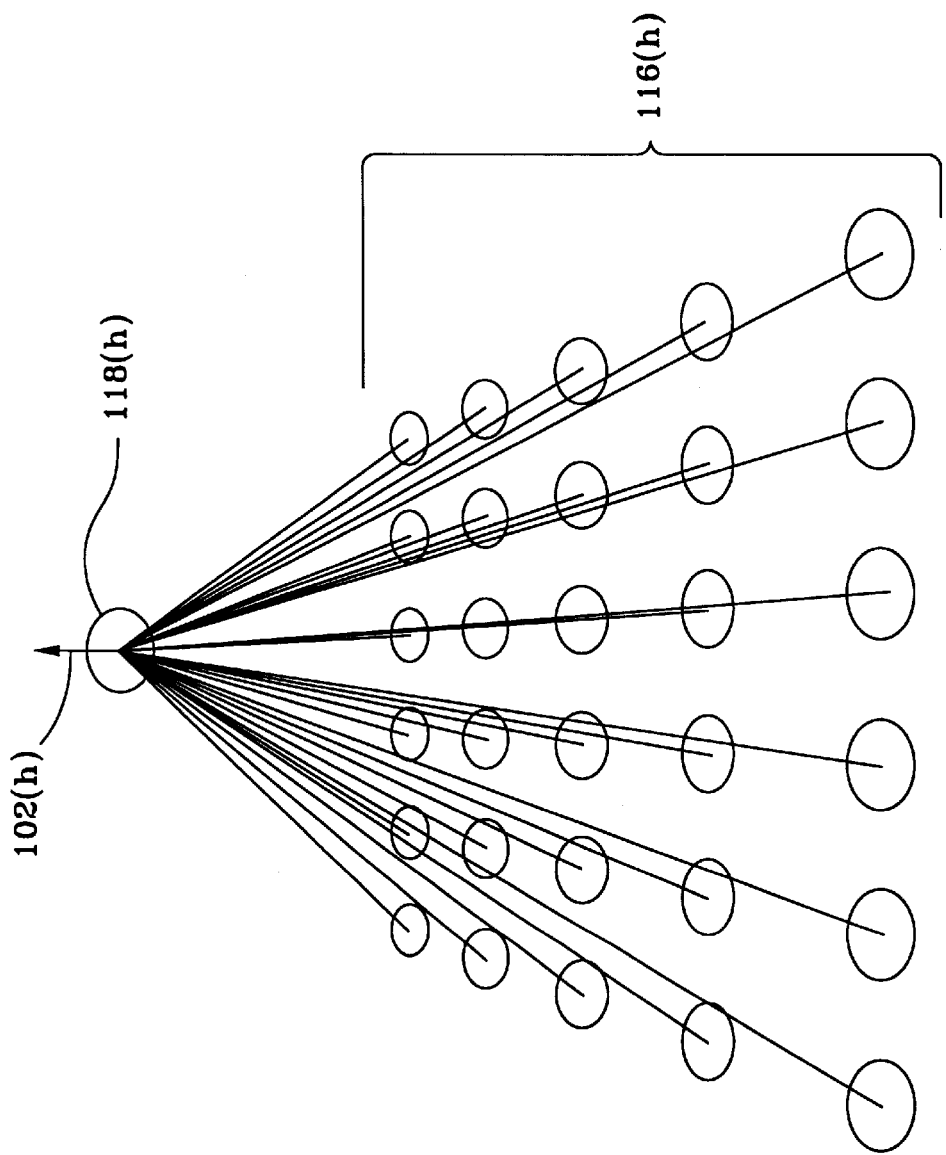
FIG. 6 ia a schematic representation of a convergence processing portion of the embodiment of FIG. 5.

In accordance with a second aspect of the invention, an image processor 100 is provided as shown in FIGS. 5 and 6. The image processor 100 provides the same output classification for a whole or partially hidden input pattern regardless of the pattern's translational positional on the retina and regardless of the scale of the size of the pattern. Unlike the multimode invariant image processor 10 described above in connection with FIGS. 1 through 4, the image processor 100 does not generate multiple simultaneous classifications for the various invariant patterns. However, image processor 100 does generate a memory vector 102, which may be used as an input for a memory processor 150. The memory processor 150 is a device that accepts multiple memory vector elements 102(1) through 102(H) to determine a classification, such as was described in the "STATIC MEMORY PROCESSOR" patent application, or a common trainable neural network, which must be trained with the retina portion 104 to recognize various pattern configurations. With reference to FIGS. 5 and 6, the image processor 100 contains retina portion 104, nonlinear processing portion 106 and convergence processing portion 108. The retina portion 104 operates in a manner similar to retina portion 12 of FIG. 1, having a photo transducer array 110 and a window difference network (WDN) 112 that operate similar to array 20 and WDN 22 of FIG. 1. However, retina portion 104 does not include a decoupler as was provided in retina portion 12. Nonlinear processing portion 106 operates generally in the manner of nonlinear processing portion 14 of FIG. 1. However, nonlinear processing portion 106 generates feature vectors that indicate, for each pixel, the likelihood that the pixel is included in a particular primitive "h" of the image. The nonlinear processing portion 106 contains a neural director, designated 114(s), for each pixel "s". Each neural director 114(s) generates a feature vector having elements designated 114(s)(1) through 114(s)(H), "H" corresponding to the number of primitives of the image. Thus, the feature vectors generated by the neural director output elements 114(1)(h) through 114(S)(h), i.e., the neural director output elements corresponding to primitive "h" for all of the pixels, effectively define a virtual common feature layer 116(h). Each feature vector contains the same number of dimensions and each dimension of each feature vector is connected to a common feature layer 116(h). Therefore, each layer 116(h) contains features of the same primitives of an image regardless of the image position on the transducer array 110. It is noted that the neural directors 114(s) of nonlinear processing portion 106 are ideal neural directors type 1 instead of the near ideal neural directors type 1 of the embodiment of FIG. 1.

The convergence processing portion 108 includes the common feature layers 116 and a summing neural network 118, a detail of which is depicted in FIG. 6. Referring to FIG. 6, the feature elements for each layer 116(h) are coupled to a summing neuron 118(h) of summing neural network 118. The summing neuron 118(h) receives the feature vectors for a corresponding feature layer 116(h) and generates a feature element whose value reflects the presence or absence of a particular primitive "h" in the image. This configuration of the image processor 100 is invariant to multiple changes in translation, scale and partial image data of a single pattern. In another embodiment, the memory processor 150 consists of a neural director 150a and a PKOM 150b similar to one of the neural directors 30(n)(s) and one of the PKOM's 34(n)(s) of FIG. 1. In this embodiment, all connections are constructed a priori. With training, the image processor 100 will produce a specific deterministic output of the PKOM for a specific input pattern. In other words, the training would consist simply of identifying the PKOM output classification assignment for the specific input pattern. The neural director of this embodiment represents a generalized matched filter receiving the activations of memory vector 102.

The image processor 100 provides a number of advantages. In particular, the processor 100 can generate deterministic output activations without training, and can be constructed using conventional integrated circuit technology.

The preceding description has been limited to specific embodiments of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed is:

1. A multimode invariant image processor for classifying patterns in an image, the processor comprising:

a retina portion for receiving the image and generating in response image gradient information;

a nonlinear processing portion for processing the image gradient information to generate image feature vectors representing image features in the image wherein the nonlinear processing portion comprises a series of neural director layers to aid in discrimination between similar patterns in the image, each layer having at least one neural director, the neural directors in a first of the layers receiving the gradient information from the retina portion and generating in response respective feature vectors each having a dimensionality at least as great as the received gradient information, each successive neural director layer receiving feature vectors generated by neural directors in each previous neural director layer and generating in response respective feature vectors each having a dimensionality at least as great as the received feature vector;

a convergence processing portion for processing the image feature vectors to generate common feature information; and a classifier portion for receiving the common feature information and generating in response classification information indicating the likelihood that selected features are present in the image.

2. A multimiode invariant image processor as defined in claim 1, wherein the convergence processing portion comprises:

a positional king-of-the-mountain circuit receiving the feature vectors from the nonlinear processing portion and generating a number of outputs, each output identifying, for one of the feature vectors, a component having the highest value; and a plurality of summing circuits, each for receiving highest value outputs for like components and generating summed outputs for the like components as the common feature information.

3. A multimode invariant image processor as defined in claim 2, wherein the convergence processing portion further comprises an interconnection network for receiving like component highest value outputs from the positional king-of-the-mountain circuit and coupling said outputs to a corresponding one of said summing circuits.

4. A multimode invariant image processor as defined in claim 2, wherein the summing circuits have a sum threshold value applied thereto such that a summed output for a summing circuit is generated only when the threshold value is exceeded.

5. A multimode invariant image processor as defined in claim 1, wherein the classifier portion comprises:

a multidimensional memory space partially populated by the common feature information from the convergence processing portion;

a recognition vector arrays having a plurality of recognition vectors in communication with the multidimensional memory space whereby the partially populated multidimensional memory space activates sets of recognition vectors within the recognition array;

a plurality of groups of king-of-the-mountain circuits, each group representing an image primitive of the image in at least one rotational position, each group receiving the corresponding recognition vectors associated with the image primitive and generating at least one group output representing a likelihood that the image contains a primitive in the at least one rotational position;

an angular vector array receiving each group output and generating angular vectors, each angular vector corresponding to a combination of all group outputs of one of the plurality of groups; and a class multi-king-of-the-mountain circuit receiving the angular vectors and generating the classification information.

6. A multimode invariant image processor as defined in claim 5, wherein the king-of-the-mountain circuits have a class threshold value applied thereto such that a group output for a king-of-the-mountain circuit is generated only when the class threshold value is exceeded.

7. A multimode invariant image processor for classifying patterns in an image, the processor comprising:

a retina portion for receiving the image and generating in response image gradient information wherein the retina portion comprises a transducer array receiving the image and transforming the image to an array of pixels, each pixel being represented by a pixel value; and a window difference network for generating, for each pixel, a gradient vector defining the difference between the pixel value for each pixel and pixel values for selected ones of pixels around each pixel;

a nonlinear processing portion for processing the image gradient information to generate image feature vectors representing image features in the image;

a convergence processing portion for processing the image feature vectors to generate common feature information; and a classifier portion for receiving the common feature information and generating in response classification information indicating the likelihood that selected features are present in the image.

8. A multimode invariant image processor as defined in claim 7, wherein the selected pixels are chosen from pixels in a predetermined window surrounding each pixel.

9. A multimode invariant image processor as defined in claim 7, wherein the selected pixels form a star pattern surrounding each pixel.

10. A multimode invariant image processor as defined in claim 7, wherein the retina portion further comprises a vector decoupler receiving the gradient vectors and adjusting the gradient vectors to remove a fixed offset determined by the vector decoupler to be present in the gradient vectors.

11. A multimode invariant image processor for classifying patterns in an image, the processor comprising:

a retina portion for receiving the image and generating in response image gradient information;

a nonlinear processing portion for processing the image gradient information to generate image feature vectors representing image features in the image, wherein the nonlinear processing portion comprises a series of neural director layers to aid in discrimination between similar patterns in the image, each layer having a plurality of neural directors, each neural director corresponding to a pixel of the image, each neural director layer corresponding to an image primitive, the neural directors in a first of the neural director layers receiving the gradient information from the retina portion and generating in response respective feature vectors each having a dimensionality at least as great as the received gradient information, each successive neural director layer receiving feature vectors generated by neural directors in each previous neural director layer and generating, in response, respective feature vectors each having a dimensionality at least as great as the received feature vector; and common feature layers, each corresponding to one of the image primitives, each common feature layer receiving all components of the feature vectors corresponding to the respective image primitive for the common feature layer;

a convergence processing portion for processing the image feature vectors to generate common feature information; and a classifier portion for receiving the common feature information and generating in response classification information indicating the likelihood that selected features are present in the image.

12. A multimode invariant image processor as defined in claim 11, wherein the convergence processing portion comprises summing neurons, each corresponding to one of the common feature layers and receiving the feature vector components for the respective common feature layer to generate an element of common feature information whose value reflects at least one of the presence and absence of the corresponding primitive in the image.

* * * * *